C. J. MELLIN & F. J. COLE.
STEAM BOILER SUPERHEATER.
APPLICATION FILED JAN. 6, 1909.

918,881.

Patented Apr. 20, 1909.
7 SHEETS—SHEET 1.

WITNESSES

INVENTORS
Att'y.

C. J. MELLIN & F. J. COLE.
STEAM BOILER SUPERHEATER.
APPLICATION FILED JAN. 6, 1909.

918,881.

Patented Apr. 20, 1909.
7 SHEETS—SHEET 3.

C. J. MELLIN & F. J. COLE.
STEAM BOILER SUPERHEATER.
APPLICATION FILED JAN. 6, 1909.

918,881.

Patented Apr. 20, 1909.
7 SHEETS—SHEET 5.

C. J. MELLIN & F. J. COLE.
STEAM BOILER SUPERHEATER.
APPLICATION FILED JAN. 6, 1909.

918,881.

Patented Apr. 20, 1909.
7 SHEETS—SHEET 6.

WITNESSES
James C. Herron.
S. R. Bell.

INVENTORS
Carl J. Mellin,
Francis J. Cole,
by Howden Bell,
Att'y.

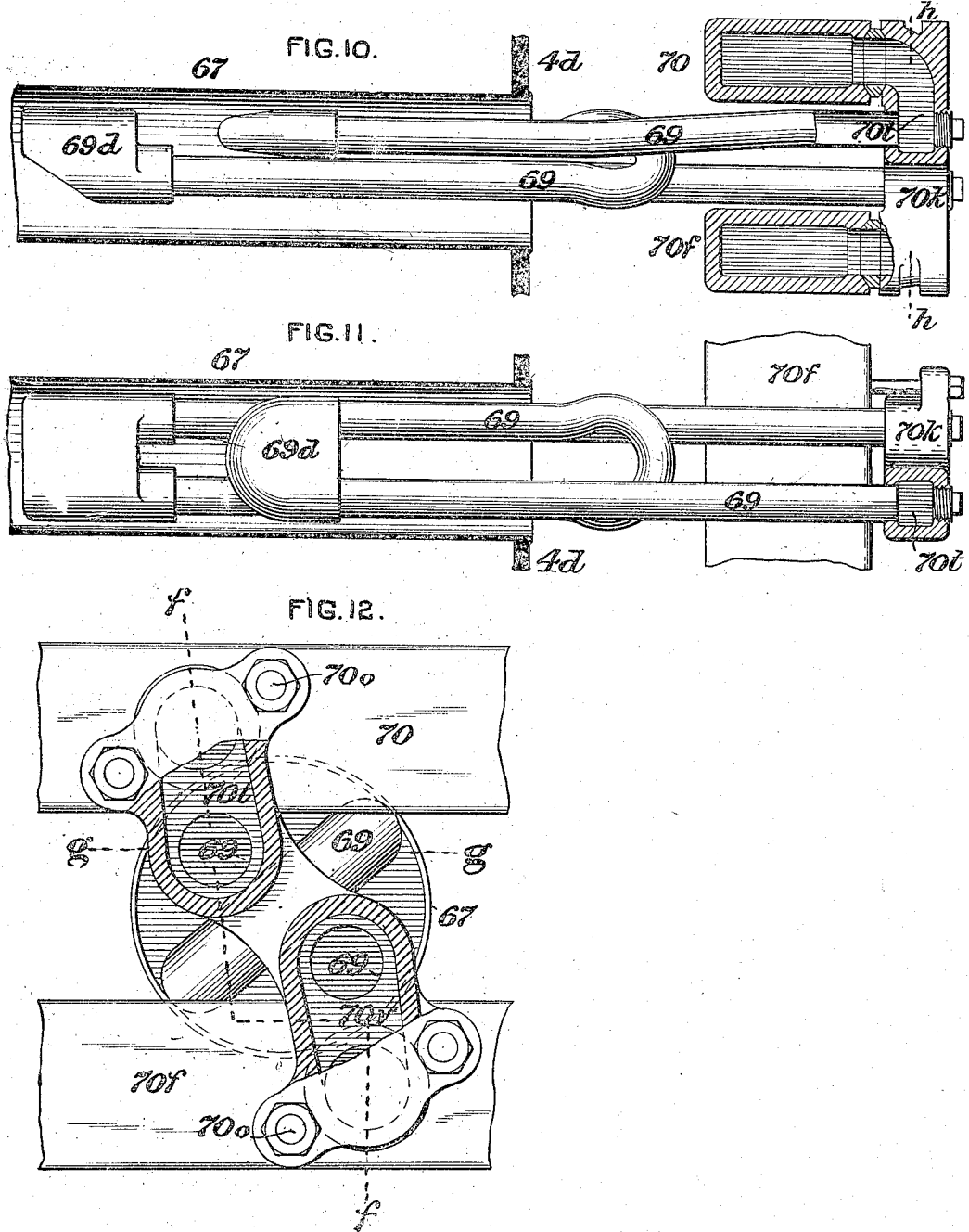

UNITED STATES PATENT OFFICE.

CARL J. MELLIN AND FRANCIS J. COLE, OF SCHENECTADY, NEW YORK, ASSIGNORS TO AMERICAN LOCOMOTIVE COMPANY, OF NEW YORK, N. Y., A CORPORATION OF NEW YORK.

STEAM-BOILER SUPERHEATER.

No. 918,881.  Specification of Letters Patent.  Patented April 20, 1909.

Application filed January 6, 1909. Serial No. 471,003.

*To all whom it may concern:*

Be it known that we, CARL J. MELLIN and FRANCIS J. COLE, both of Schenectady, in the county of Schenectady and State of New York, have jointly invented a certain new and useful Improvement in Steam-Boiler Superheaters, of which improvement the following is a specification.

Our invention relates to superheaters of the general class or type in which the superheater pipes are located in fire tubes of a steam boiler, instances of which are exemplified in Letters Patent of the United States Nos. 765,307 and 849,052 granted and issued to American Locomotive Company, as assignee of Francis J. Cole, under dates of July 19, 1904 and April 2, 1907, respectively.

The object of our invention is to provide a superheater of such general type which shall embody, as characteristic features of improvement, a substantial reduction in the number of joints required to be made and maintained steam tight; capability of ready removal and replacement of one or more pairs of superheater pipes without interference with the remainder of the appliance; tight and secure connections between the superheater pipes and headers; and exemption from cooling of the superheated steam by the action thereon of saturated steam during the passage of the latter from the boiler to and through the superheating appliances.

The improvement claimed is hereinafter fully set forth.

Figure 1:
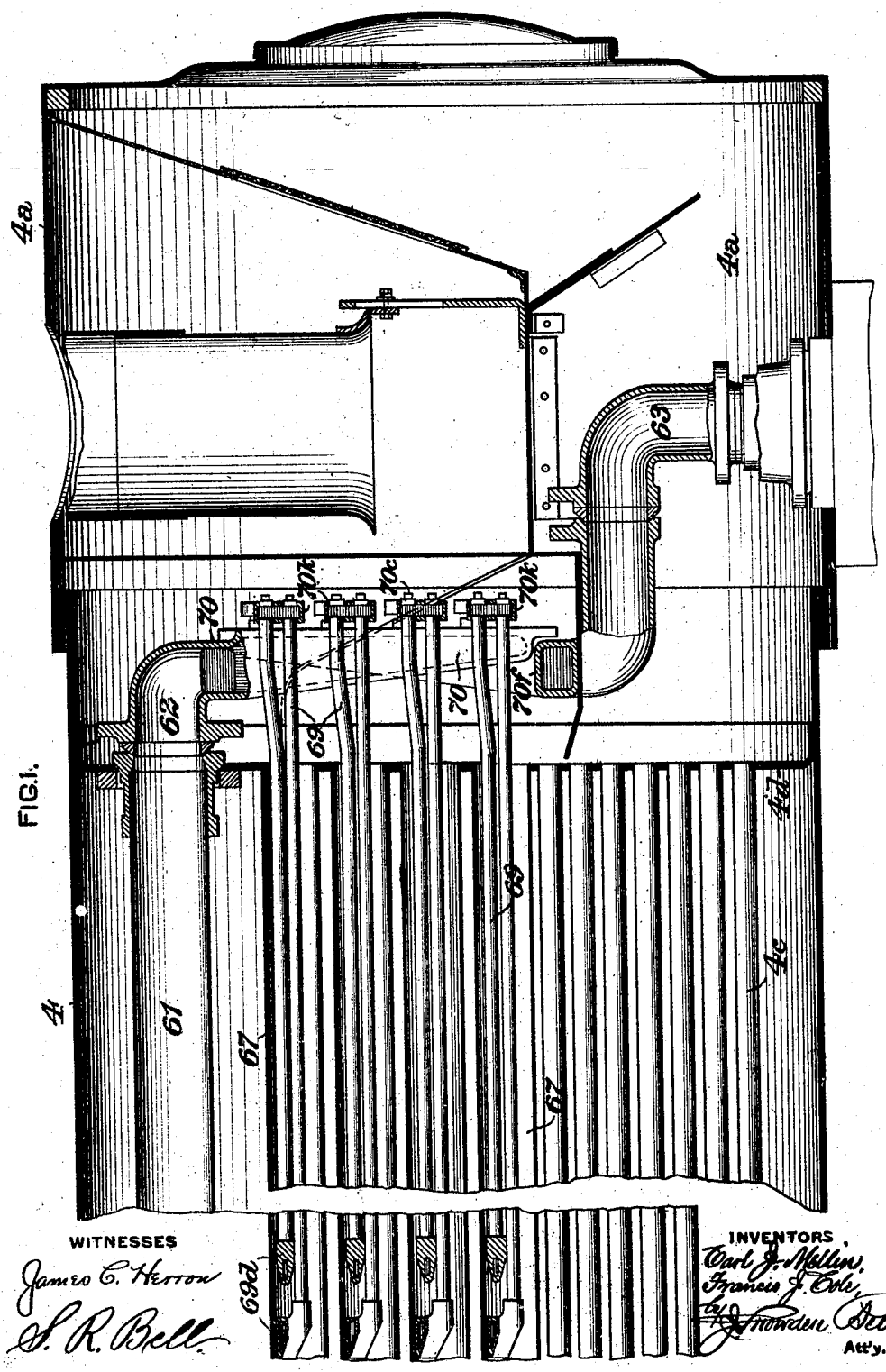
Figure 2:
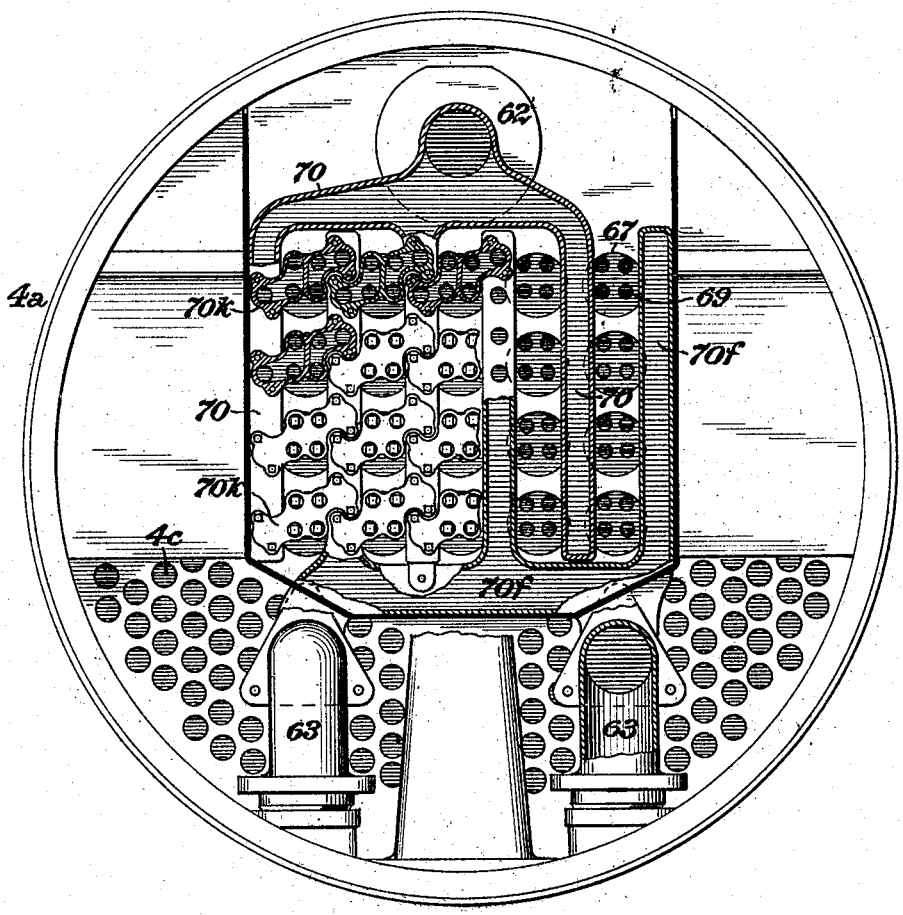
Figure 3:
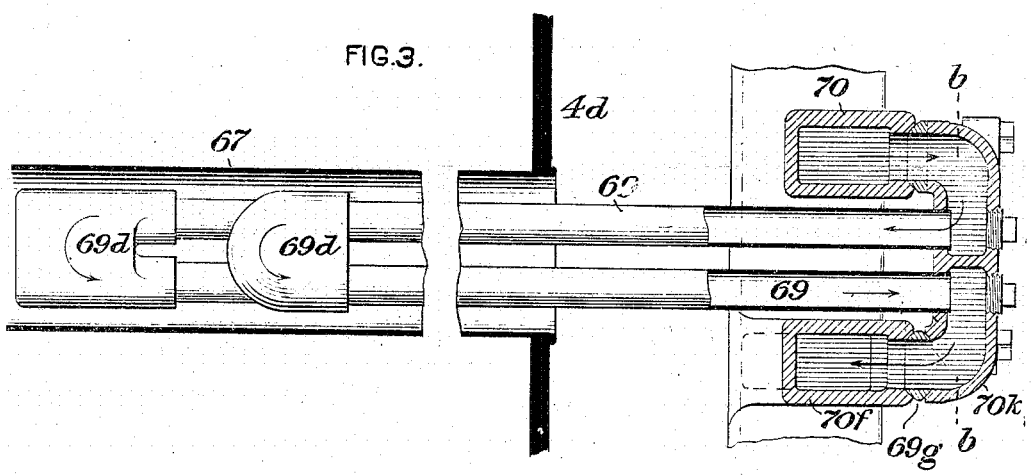
Figure 4:
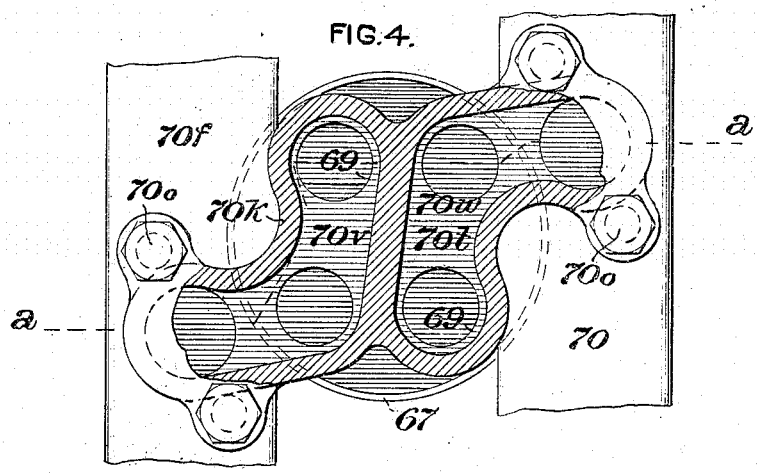
Figure 5:
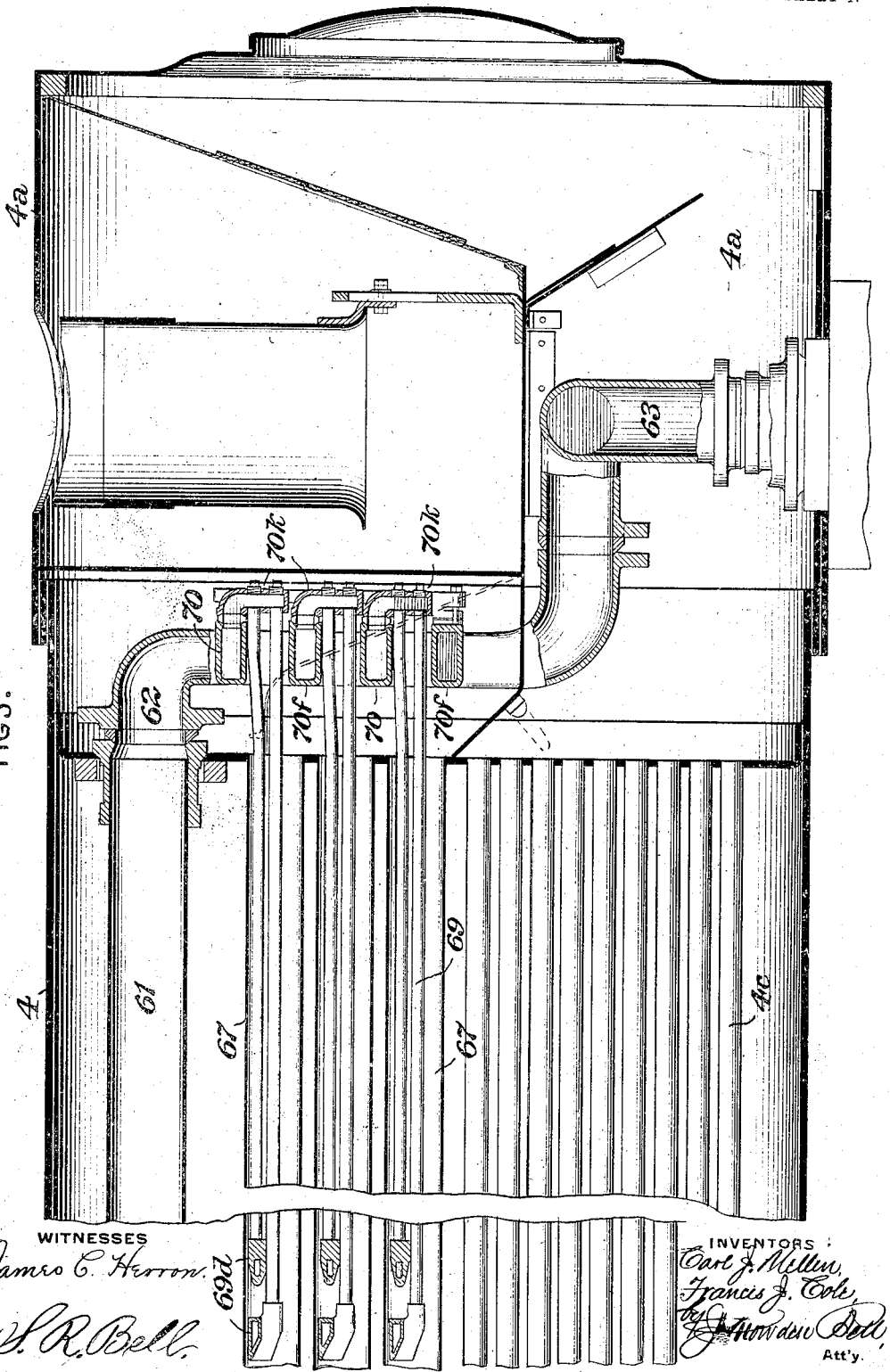
Figure 6:
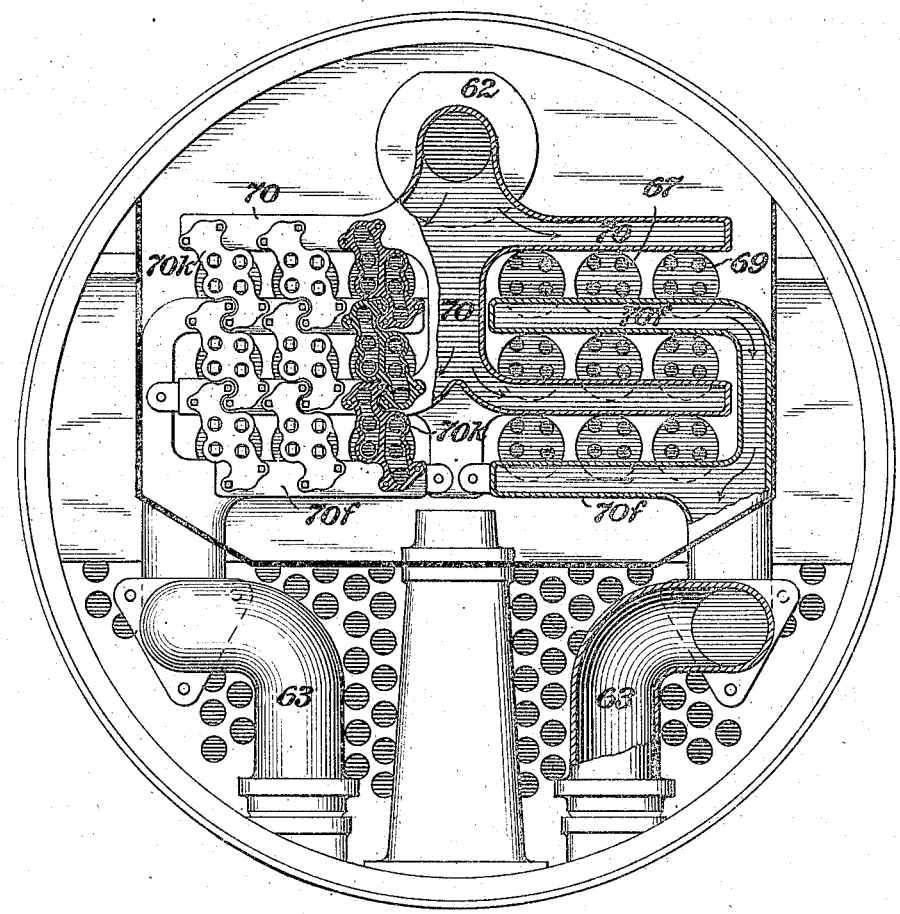
Figure 7:
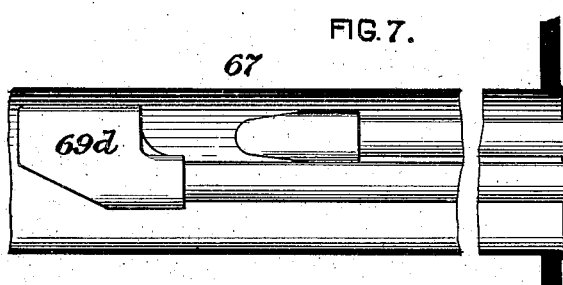
Figure 8:
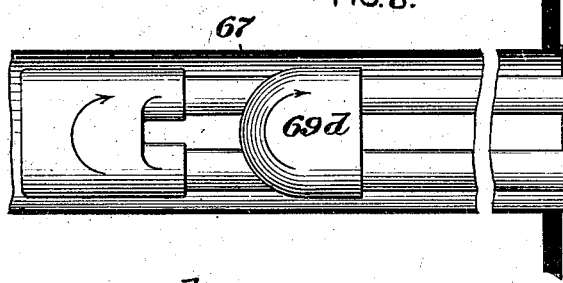
Figure 9:
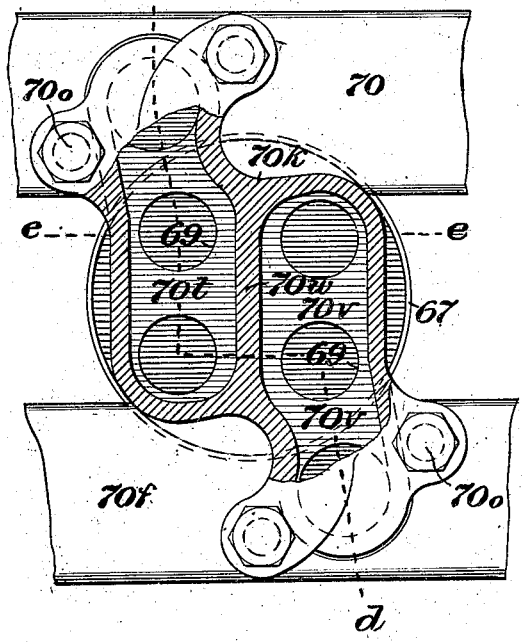

In the accompanying drawings, Figure 1 is a vertical longitudinal section through the forward portion of a locomotive boiler, illustrating an application of our invention; Fig. 2, a vertical transverse section through the headers, the casing inclosing the same, and some of the connection chambers of the superheater pipes and headers; Fig. 3, a horizontal section, on an enlarged scale, through the forward portion of a superheating tube, and through the saturated and superheated steam headers, and a connection chamber, the three latter members being shown in section on the line $a\ a$ of Fig. 4; Fig. 4, a vertical section, on a further enlarged scale, through a connection chamber, on the lines $b\ b$ of Figs. 3 and 5; Fig. 5, a section similar to that of Fig. 1, illustrating a modification of structural detail; Fig. 6, a view, partly in front elevation and partly in section, of the structural modification shown in Fig. 5; Fig. 7, a vertical section, on an enlarged scale, through the forward portion of one of the superheating tubes of Figs. 5 and 6, and through the saturated and superheated steam headers and a connection chamber, the two latter members being shown in section on the line $d\ d$ of Fig. 9; Fig. 8, a horizontal section through said superheating tube, and through the connection chamber on the line $e\ e$ of Fig. 9; Fig. 9, a view, partly in front elevation and partly in section on the line $c\ c$ of Fig. 7, and on a further enlarged scale, of the connection chamber of Figs. 7 and 8; Fig. 10, a view, similar to Fig. 7, but showing a modification of structural detail of the header and of the manner of forming the loops of superheater pipe, the headers and connection chamber being shown in section on the line $f\ f$ of Fig. 12; Fig. 11, a horizontal section, on the line $g\ g$ of Fig. 12; and, Fig. 12, a view, partly in front elevation and partly in section on the lines $h\ h$ of Fig. 10, and on a further enlarged scale, of the connection chamber of Figs. 10 and 11.

Our invention is herein, as in Letters Patent Nos. 765,307 and 849,052 aforesaid, set forth as applied in connection with a locomotive boiler, 4, which is of the ordinary construction, and is provided at its forward end with a smoke box, 4ᵃ. A plurality of fire tubes, 4ᶜ, ordinarily of comparatively small diameter, extend from the fire box at the rear end of the boiler, which is not shown, to the front flue sheet, 4ᵈ, and the products of combustion pass through said tubes and through a number of tubes, 67, of larger diameter, which are located in the upper and middle portion of the space within the boiler and which will be herein descriptively termed "superheating tubes" to the smoke box, 4ᵃ, from which they are discharged into the atmosphere through a stack in the ordinary manner. Steam is supplied from the boiler to the cylinders through a main steam pipe or dry pipe, 61, passing through the front flue sheet, 4ᵈ, and connected in front thereof to a T head, 62, from which it is conducted through superheater pipes, 69, which, with their connections, will be presently described, and, after being superheated in said pipes, passes to the cylinders through headers, $70^f$, and connected steam pipes, 63, located on opposite sides of the smoke box.

In the practice of our invention, we locate in each of the superheating tubes, 67, one or more pairs (preferably as shown, an upper and a lower pair) of superheater pipes, 69, said pipes extending longitudinally in the superheating tubes from a vertical plane a short distance, say thirty inches or thereabout, forward of the fire box flue sheet to vertical planes in the smoke box forward of the front flue sheet. The superheater pipes of each pair are connected in U form at their rear ends, as by a return bend, $69^d$, and may be held up in normal position in the superheating tubes by any suitable and preferred supports. The superheater pipes are open at their forward ends, at which they communicate, through connections hereinafter described, with the main steam supply pipe, 61, and the branch or delivery steam pipes, 63, respectively, so as to constitute continuous avenues or channels throughout the length of which the steam which is to be superheated passes from the supply steam pipe to the branch delivery steam pipes.

The T head, 62, which is, as heretofore located in front of the upper portion of the tube sheet, $4^d$, is connected, preferably, as shown, by being cast integral therewith, with a saturated steam header, 70, which, in the form shown in Figs. 1 to 4 inclusive, consists of a hollow or tubular body, communicating with, and extending horizontally on opposite sides of, the T head, and a plurality of parallel vertical arms or branches, communicating with, and extending downwardly from the body. In the structural modification shown in Figs. 5 to 9 inclusive, and 10 to 12 inclusive, the relative position of the members of the saturated steam header is changed, that is to say, the body is vertical and the communicating branches are horizontal, the principle and operative relation of the header to the other members of the appliance being, however, the same in both cases.

A superheated steam header, $70^f$, substantially similar in form to the saturated steam header, that is to say, consisting of a hollow or tubular body and a plurality of arms or branches communicating therewith, is supported in the smoke box below the saturated steam header, 70, its branches being alternated in position with those of the latter, the superheated steam header communicating, by lateral branch or delivery steam pipes, 63, with supply steam passages leading to the engine cylinders. Where the branches of the saturated steam header are horizontal, as most clearly shown in Fig. 7, two superheated steam headers, $70^f$, are applied, one on each side of the saturated steam header, each having horizontal branches, alternated in position with those of the latter, and communicating, by a delivery steam pipe, 63, with a supply steam passage leading to one of the engine cylinders.

The connection of the ends of the steam superheating channels formed by the superheater pipes, 69, to the saturated and superheated steam headers, respectively, which is effected through the intermediation of connection chambers, $70^k$, hereinafter described, in such manner as to reduce the number of steam tight joints, insure tight joints, and admit of the ready and convenient attachment and detachment of any one or more pairs of superheater pipes to and from the headers, is a leading and characteristic feature of our invention.

The construction herein exemplified as desirably adapted for the attainment, in practical and regular service, of the results above stated, is the following. Referring first to Figs. 1 to 9 inclusive, the connection chambers, $70^k$, one of which is provided for each of the superheater tubes, 67, are hollow or chambered castings, each of which is divided by a partition, $70^w$, into a saturated steam compartment, $70^t$, and a superheated steam compartment, $70^v$. If preferred, the partition, $70^w$, may be made double, so as to interpose an open space between the compartments, as in Fig. 12. The forward end of one pipe of each of the pairs or loops of superheater pipes, 69, of the superheating tube, 67, in front of which the connection chamber, $70^k$, is located, is expanded into an opening in the rear wall of the saturated steam compartment, $70^t$, and the forward end of the other pipe of the pair is similarly connected to the rear wall of the superheated steam compartment, $70^v$. Openings, closed by removable plugs, $70^u$, are formed in the front walls of the connection chambers, these openings providing for the insertion, examination, cleaning, and repairs of the superheater pipes. The saturated steam compartments, $70^t$, of the connection chambers communicate with the saturated steam header, 70, through openings adjoining one of their ends, and the superheated steam compartments, $70^v$, of the connection chambers, communicate with the superheated steam header, $70^f$, through openings adjoining their opposite ends. The connection chambers are secured detachably to the saturated and superheated steam headers by pairs of bolts, $70^o$, passing through lugs on the connection chambers on opposite sides of their end openings, ball joints, 69ᵍ, being interposed between them and the headers, to insure tightness, and the center lines of the connection chambers are inclined relatively to the branches of the headers, as shown in Figs. 2, 4, 6 and 12, to economize space.

Figs. 10 to 12 inclusive illustrate a structural modification in which the superheater pipes are bent and connected by return bends, so as to form a double return of a single line of pipe. In this case, the ends of the line of pipe are connected to the saturated and the superheated steam compartments of the connection chambers, respectively, and the latter are secured to the headers, in the same manner as above described.

The facilities for assembling and taking down the entire superheating appliance, and for the removal and insertion of any desired part or parts thereof, as may from time to time become necessary or desirable, as well as for making and maintaining tight joints, and for exposing a large area of effective heating surface to the action of the hot products of combustion passing through the smoke box, will be obvious to those familiar with locomotive boiler construction.

We claim as our invention and desire to secure by Letters Patent:

1. In a steam boiler superheater, the combination of a T head, a communicating saturated steam header, a superheated steam header, a connection chamber located in front of said headers and having a saturated and a superheated steam compartment, communicating, respectively, with the saturated and the superheated steam headers, and a pair of superheater pipes connected at their rear ends and communicating, at their forward ends, with the compartments of the connection chamber.

2. In a steam boiler superheater, the combination of a saturated steam header, a superheated steam header, a connection chamber located in front of said headers; said chamber being independent thereof and of the T head and having a saturated and a superheated steam compartment communicating, respectively, with the saturated and the superheated steam headers, bolts securing the connection chamber detachably to the headers, and a pair of superheater pipes connected at their rear ends and extending between the headers and communicating, at their forward ends, with the compartments of the connection chamber.

3. In a steam boiler superheater, the combination of a saturated steam header, a superheated steam header, a connection chamber located in front of said headers and having a saturated and a superheated steam compartment, communicating, respectively, at the ends of the chamber, with the saturated and the superheated steam headers, ball joints interposed between the connection chamber and the headers, bolts securing the connection chamber, adjacent to its ends, detachably to the headers, and a pair of superheater pipes connected at their rear ends and communicating, at their forward ends, with the compartments of the connection chamber.

4. In a steam boiler superheater, the combination of a T head, a communicating saturated steam header, a superheated steam header, a connection chamber located in front of said headers with its center line inclined relatively thereto, and having a saturated and a superheated steam compartment communicating, respectively, with the saturated and the superheated steam headers, and a pair of superheater pipes connected at their rear ends and communicating, at their forward ends, with the compartments of the connection chamber.

5. In a steam boiler superheater, the combination of a T head, a communicating saturated steam header, a superheated steam header, a connection chamber located in front of said headers and having a saturated and a superheated steam compartment communicating, respectively, with the saturated and the superheated steam headers, and pairs of superheater pipes independently connected to, and detachable from, the connection chamber, the pipes of each pair being connected at their rear ends and communicating, at their forward ends, with the compartments of the connection chamber.

6. In a steam boiler superheater, the combination of a saturated steam header having a plurality of communicating branches, a superheated steam header having a plurality of communicating branches alternated in position relatively to those of the saturated steam header, a plurality of connection chambers, each extending in front of a saturated steam header branch and a superheated steam header branch and having a saturated and a superheated steam compartment communicating, respectively, with said branches, and a plurality of pairs of superheater pipes, the pipes of each pair being connected at their rear ends and communicating, at their forward ends, with the compartments of the connection chamber.

7. The combination, with a tubular steam boiler, of a plurality of superheating tubes, a saturated steam header located forward of said tubes and having a plurality of branches communicating with a steam supply pipe, a superheated steam header having a plurality of branches alternated in position with those of the saturated steam header and communicating with a steam delivery pipe, a plurality of connection chambers (one for each superheating tube) each having a saturated and a superheated steam compartment communicating, respectively, with the adjacent saturated and superheated steam header branches, and a plurality of pairs of superheater pipes extending in the superheating tubes, each pair being independently connected to and detachable from a connection chamber and its pipes being connected at their rear ends and communicating, at their forward ends, with the compartments of a connection chamber.

CARL J. MELLIN.
FRANCIS J. COLE.

Witnesses:
W. F. DRYSDALE,
M. A. GILMORE.